(12) United States Patent
Catton et al.

(10) Patent No.: US 7,458,439 B2
(45) Date of Patent: Dec. 2, 2008

(54) MACHINE CONTROL PEDESTAL

(75) Inventors: Jonathan Chase Catton, Brimfield, IL (US); Daniel Edward Shearer, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 337 days.

(21) Appl. No.: 10/929,470

(22) Filed: Aug. 31, 2004

(65) Prior Publication Data
US 2006/0042857 A1 Mar. 2, 2006

(51) Int. Cl.
*B60K 26/00* (2006.01)

(52) U.S. Cl. .................. 180/334; 172/4.5; 248/125.8

(58) Field of Classification Search ............... 180/326, 180/334; 248/125.8, 125; 172/4.5
See application file for complete search history.

(56) References Cited

U.S. PATENT DOCUMENTS

| | | | |
|---|---|---|---|
| 3,580,636 A | 5/1971 | Setto | 297/417 |
| 4,055,230 A | 10/1977 | Kestian et al. | 180/89.1 |
| 4,140,200 A | 2/1979 | Tucek | 180/77 |
| 4,158,968 A | 6/1979 | Wilson et al. | 74/471 |
| 4,175,638 A | 11/1979 | Chrstensen | 180/140 |
| 4,200,166 A | 4/1980 | Hansen | 180/77 |
| 4,476,954 A | 10/1984 | Johnson et al. | 180/333 |
| 4,478,308 A | 10/1984 | Klaassen | 180/326 |
| 4,523,488 A | 6/1985 | Ahrendt | 74/471 |
| 4,699,239 A | 10/1987 | Ishino et al. | 180/315 |
| 4,702,520 A | 10/1987 | Whisler et al. | 297/417 |
| 4,730,691 A * | 3/1988 | Grigg | 180/329 |
| 4,798,099 A | 1/1989 | Alexander et al. | 74/473 |
| 4,895,039 A | 1/1990 | Hegg | 74/471 |
| 4,895,040 A | 1/1990 | Soederberg | 74/491 |
| 4,914,976 A | 4/1990 | Wyllie | 74/523 |
| 4,978,273 A | 12/1990 | Radke et al. | 414/697 |
| 5,042,314 A | 8/1991 | Rytter et al. | 74/335 |
| D323,279 S | 1/1992 | Soederberg | D8/300 |
| 5,244,066 A | 9/1993 | Mackoway et al. | 192/13 |
| 5,286,078 A | 2/1994 | Mottino et al. | 296/153 |
| 5,326,063 A | 7/1994 | Stevens | 248/282 |
| 5,360,312 A | 11/1994 | Mozingo | 414/685 |
| 5,379,663 A | 1/1995 | Hara | 74/471 |
| 5,409,079 A * | 4/1995 | Strong et al. | 180/326 |
| 5,448,028 A | 9/1995 | Filion et al. | 200/52 |
| 5,533,590 A | 7/1996 | Steffen et al. | 180/332 |
| 5,553,992 A | 9/1996 | Ashcroft | 414/685 |
| 5,566,778 A | 10/1996 | Valier et al. | 180/334 |
| 5,584,346 A | 12/1996 | Sakamoto et al. | 172/4.5 |
| 5,666,861 A * | 9/1997 | Fee et al. | 74/523 |
| 5,924,515 A | 7/1999 | Stauffer | 180/326 |
| 5,938,282 A | 8/1999 | Epple | 297/217.3 |
| 5,960,903 A | 10/1999 | Abels et al. | 180/315 |
| H1831 H | 2/2000 | Kelley et al. | 180/333 |
| 6,039,141 A | 3/2000 | Denny | 180/329 |
| 6,065,365 A | 5/2000 | Ostler et al. | 74/528 |

(Continued)

*Primary Examiner*—Eric Culbreth
(74) *Attorney, Agent, or Firm*—Finnegan, Henderson, Farabow, Garrett & Dunner

(57) ABSTRACT

An adjustable control pedestal for a work machine. The control pedestal may include a base configured to be rigidly mounted to a chassis of the work machine. The control pedestal may also include an armrest portion having a joystick mounted thereto configured to control at least one function of the work machine, the armrest portion being connected to the base and configured to enable an operator to rest an arm on the armrest portion while operating the joystick. The armrest portion may be linearly movable relative to the base.

26 Claims, 5 Drawing Sheets

U.S. PATENT DOCUMENTS

| | | |
|---|---|---|
| H1851 H | 6/2000 | Kelley et al. ................. 180/333 |
| D427,207 S | 6/2000 | Altmann et al. ............... D15/28 |
| D429,246 S | 8/2000 | Holma ...................... D14/412 |
| 6,148,688 A * | 11/2000 | Nishimaki ................... 74/493 |
| 6,164,285 A | 12/2000 | Garberg et al. .............. 130/326 |
| 6,170,598 B1 * | 1/2001 | Furukawa ................... 180/334 |
| 6,176,337 B1 * | 1/2001 | McConnell et al. ......... 180/208 |
| 6,276,749 B1 | 8/2001 | Okazawa et al. ....... 296/190.08 |
| D463,459 S | 9/2002 | Tamaru et al. ................ D15/28 |
| 6,523,617 B2 | 2/2003 | McGugan ................... 172/4.5 |
| 6,550,562 B2 | 4/2003 | Brandt et al. ............... 180/333 |
| 6,634,453 B2 * | 10/2003 | Arthur et al. ................ 180/315 |
| 6,702,373 B2 | 3/2004 | Rossko ...................... 297/173 |
| 7,014,255 B2 * | 3/2006 | Amamiya et al. ...... 296/190.08 |
| 2002/0166267 A1 | 11/2002 | McGugan .................... 37/348 |
| 2003/0188912 A1 | 10/2003 | Amamiya ................... 180/336 |

* cited by examiner

//MACHINE CONTROL PEDESTAL

TECHNICAL FIELD

This disclosure is directed to a control pedestal for a work machine and, more particularly, to an adjustable floor-mounted control pedestal for controlling functions of a work machine.

BACKGROUND

Whether driving off-road or operating a work implement, an operator of a work machine may be subjected to sudden and/or severe movements during the normal course of machine operation. Such movements may include, for example, a bumpy ride during off-road driving or various jarring impacts from engagement of a work implement with a work surface.

Seating systems have been developed to insulate the operator from these sudden and/or severe movements in order to help operators maintain a seating position suitable for operating the machine. In particular, operator seats are commonly provided with suspension to somewhat isolate the operator from movements of the work machine chassis.

In addition to maintaining a suitable seating position, an operator may be required to make minute control inputs to accurately control functions of a work machine. These minute control inputs are more easily made if an operator can maintain a steady hand. To help operators maintain a steady hand, armrest control consoles have been used to support the hand and arm of an operator.

Armrest control consoles have been mounted to operator seats in order to maintain a positional relationship between the control console and the seat despite adjustment and/or movement of the seat. In addition, control consoles have been mounted to suspended seats in order to insulate the controls from sudden and/or severe movements of the work machine chassis. Control consoles have also been provided with adjustability to enable operators of various sizes to create a comfortable and supportive seating position. Further, controls for work machines have been consolidated so as to provide multiple controls with a single lever, commonly called a "joystick." For example, U.S. Pat. No. 4,702,520 (the '520 patent) to Whisler et al. discloses an adjustable armrest control console having a joystick mounted thereto. The '520 patent further teaches that the console is attached to the operator seat.

However, while the console of the '520 patent may provide support and stability for an operator's arm by being mounted to the seat, it may also isolate the operator from tactile feedback that may enhance their ability to control the work machine. Suspending controls rather than rigidly attaching them to a work machine chassis may eliminate or significantly reduce tactile feedback through the controls that may enable an operator to better sense the movements of the work machine. Without having this kind of sensory information to take into account, an operator may not be able to control the functions of the work machine as accurately. Also, the '520 patent teaches only limited adjustability of the console. The overall height of the console is not adjustable, nor may the console be adjusted fore and aft or rotated side-to-side.

The disclosed control pedestal is directed towards overcoming one or more of the problems set forth above.

SUMMARY OF THE INVENTION

In one aspect, the present disclosure is directed to an adjustable control pedestal for a work machine. The control pedestal may include a base configured to be rigidly mounted to a chassis of the work machine. The control pedestal may also include an armrest portion having a joystick mounted thereto configured to control at least one function of the work machine, the armrest portion being connected to the base and configured to enable an operator to rest an arm on the armrest portion while operating the joystick. The armrest portion may be linearly movable relative to the base.

In another aspect, the present disclosure is directed to a work machine. The work machine may include an operator station. The operator station may include a floor, an operator seat suspended on the floor, and a control pedestal. The control pedestal may include a base mounted on a chassis of the work machine, and an armrest portion connected to the base and having a joystick mounted thereon configured to control one or more functions of the work machine.

In another aspect, the present disclosure is directed to a motor grader. The motor grader may include a traction system, a power source, and a work implement. The motor grader may further include an operator station having a floor, an operator seat suspended on the floor, and a control pedestal. The control pedestal may include a base rigidly mounted to a chassis of the motor grader and an armrest portion connected to the base and having a joystick mounted thereon configured to control one or more functions of the motor grader.

DETAILED DESCRIPTION

Reference will now be made in detail to the drawings. Wherever possible, the same reference numbers will be used throughout the drawings to refer to the same or like parts.

Figure 1:
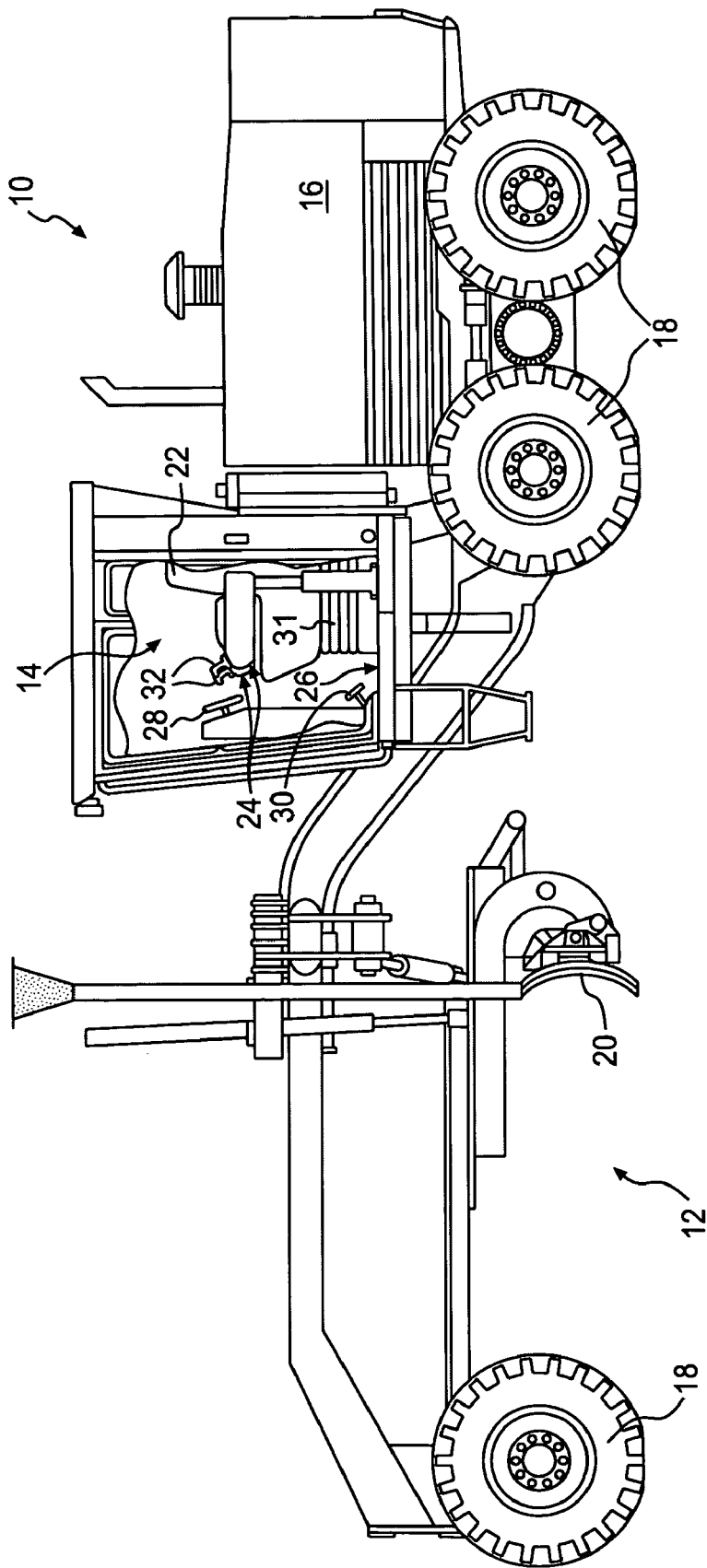
FIG. 1 is a diagrammatic illustration of a work machine according to an exemplary disclosed embodiment.

FIG. 1 illustrates an exemplary embodiment of a work machine 10. Although work machine 10 is shown as a motor grader, work machine 10 may include other types of work machines such as, for example, track-type tractors (e.g. bulldozers), wheeled tractors, loaders, excavators, and any other type of work machine. Work machine 10 may include a work implement 12, an operator station 14, a power source 16, and one or more traction devices 18.

Work implement 12 may include a blade 20 as shown in FIG. 1. Alternatively, work implement 12 could include a bucket, scraper, claw, or any other type of work implement.

Although traction devices 18 are shown in the figures as wheels, traction devices 18 could alternatively be tracks or any other type of traction devices. Traction devices 18 could also be combinations of different types of traction devices. For example, work machine 10 could include both wheels and tracks.

Operator station 14 may reside in an enclosed cab, as shown in FIG. 1. Alternatively, operator station 14 could be open-topped or covered but otherwise open. FIG. 1 shows a cutaway portion revealing an interior layout of operator station 14, which may include an operator seat 22, a control pedestal 24 mounted to a floor 26 of operator station 14, and additional controls such as a steering wheel 28 and one or more foot pedals 30.

Operator seat 22 may be a suspended seat. That is, in addition to having conventional seat cushion material and/or springs within the cushion to soften the ride, operator seat 22 may be attached to floor 26 by a suspension system 31. Suspension system 31 may be of any design to attenuate transmission of sudden and/or severe movements of work machine 10 to operator seat 22. For example, suspension system 31 may include a set of coil springs or air springs (not shown). Suspension system 31 may also include one or more damping devices, such as, for example, shock absorbers.

Control pedestal 24 may be positioned anywhere on work machine 10 suitable for use by an operator. Operator station 14 may include more than one control pedestal 24, for example, work machine 10 may be provided with two control pedestals 24, one for each side of operator seat 22. Control pedestal 24 may be rigidly mounted to floor 26 or any other component of the chassis of work machine 10. Control pedestal 24 may include a joystick 32 configured to control one or more functions of work machine 10.

Operator station 14 may include additional controls, such as steering wheel 28 and foot pedal 30. Operator station 14 may also include other types of additional controls, such as additional levers or joysticks, dials, and/or switches. The additional controls may control different functions of work machine 10 than does joystick 32. The additional controls may also control one or more of the same functions as does joystick 32. For example, both joystick 32 and steering wheel 28 may be configured to steer work machine 10. Duplicate controls for the same function may be provided for safety reasons (i.e., a backup system) or simply to offer an operator an option to choose the control that is more comfortable to them.

Figure 2:
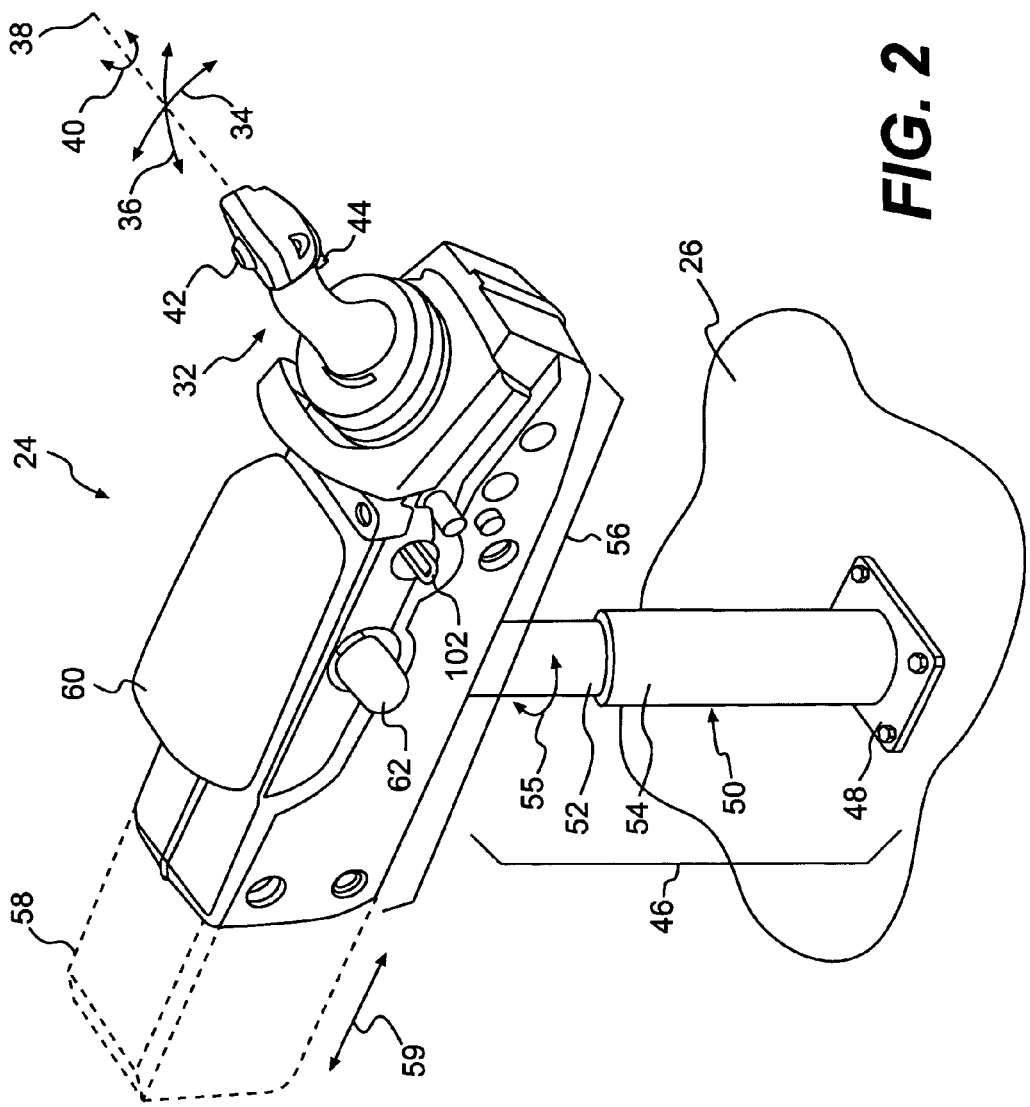
FIG. 2 is a diagrammatic perspective view of a control pedestal according to an exemplary disclosed embodiment.

FIG. 2 illustrates an exemplary embodiment of control pedestal 24. Control pedestal 24 may include joystick 32, a base 46, and an armrest portion 56.

Joystick 32 may be any type of control lever and may control a single function or multiple functions. For example, each movement of joystick 32 may control a different function of work machine 10. Exemplary movements of joystick 32 may include fore and aft motion, as indicated by a double-headed arrow 34, side-to-side motion, as indicated by a double-headed arrow 36, and rotational motion about an axis 38, as indicated by a double-headed arrow 40. Other functions may be controlled from joystick 32 with buttons and switches on joystick 32, such as a push-button 42 and a trigger 44. Possible functions that may be controlled by these different motions, buttons, and switches may include movements of work implement 12 (FIG. 1), steering of work machine 10, throttle, braking, and any other movements or functions of work machine components.

Base 46 may include a base plate 48, which may be fixedly attached, in any conventional manner (e.g., bolts, welds, clamps, etc.) to floor 26 or another part of the chassis of work machine 10. Base 46 may also include a post 50. Post 50 may be height adjustable, for example, by telescoping an upper portion 52 within a lower portion 54. Base 46 may also permit rotation of armrest portion 56 in a direction indicated by double-headed arrow 55. In order to permit this rotation, upper portion 52 may be rotatable relative to lower portion 54. Alternatively a bearing or other rotatable component mounted to or incorporated in base 46 may enable rotation of armrest portion 56 relative to floor 26. Rotation of armrest portion 56 may facilitate ingress and egress from operator seat 22 and enable an operator to orient armrest portion 56 at a comfortable angle.

Armrest portion 56 may be supported by base 46. Accordingly, the height of armrest portion 56 may be adjusted by adjusting the height of post 50. Additionally, armrest portion 56 may slide fore and aft with respect to base 46 as indicated by a dashed outline 58 and corresponding movement arrow 59. This sliding movement may facilitate ingress and egress from operator seat 22 and enable an operator to position armrest portion 56 at a comfortable position during operation of work machine 10. Joystick 32 may be mounted on armrest portion 56. Therefore, sliding of armrest portion 56 fore and aft may enable the operator to position joystick 32 such that it may be comfortably grasped during use.

Control pedestal 24 may also include an arm support 60, which may be attached to armrest portion 56. The position of arm support 60 relative to armrest portion 56 may be adjustable. The position of arm support 60 may be adjusted by loosening a knob 62 that may otherwise hold arm support 60 in a fixed position relative to armrest portion 56. When knob 62 has been loosened, arm support 60 may be freely adjusted for height and incline.

Figure 3:
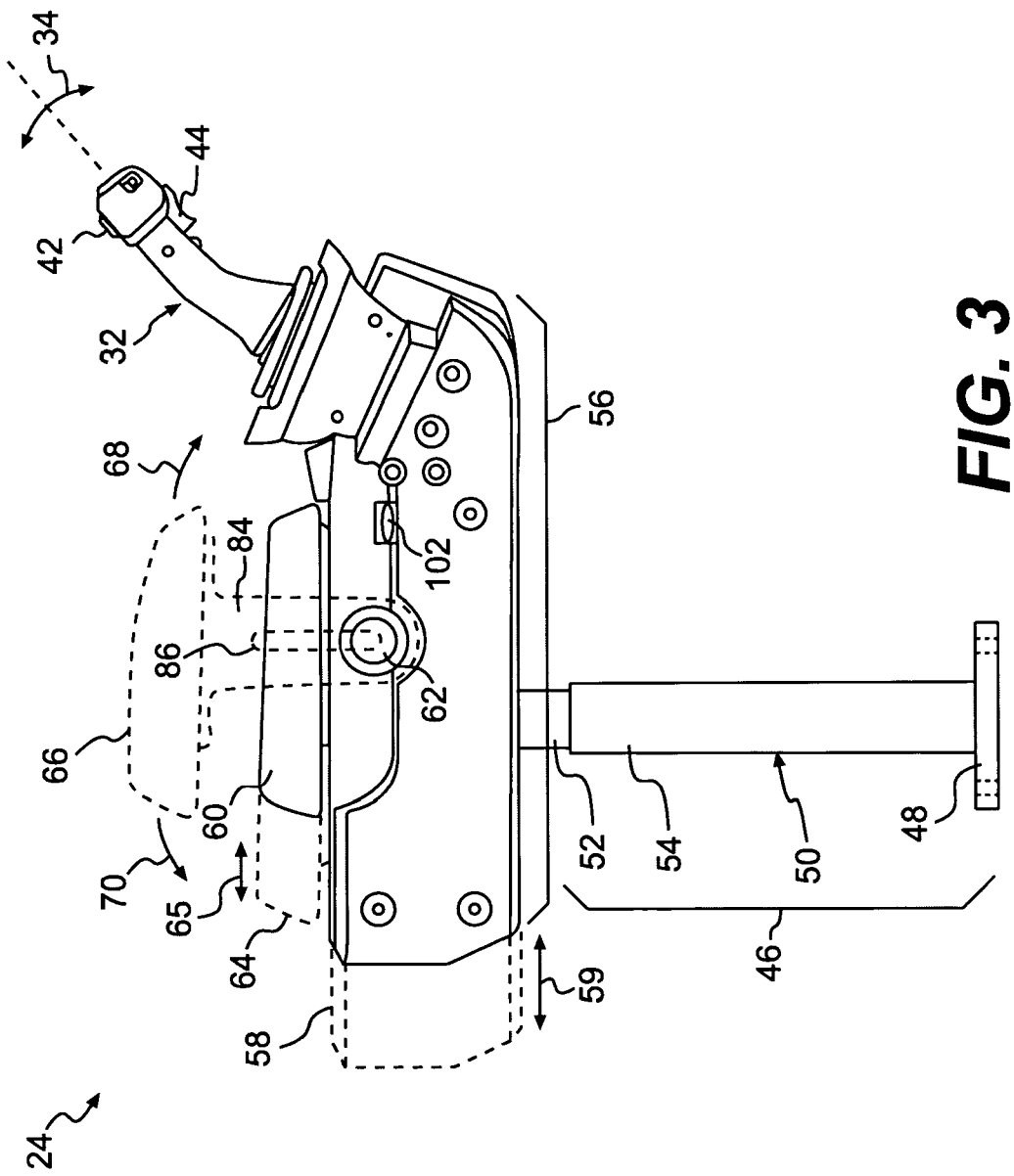
FIG. 3 is a diagrammatic side view of the control pedestal of FIG. 2.

FIG. 3 illustrates the adjustability of arm support 60. Because arm support 60 may be fixed relative to armrest portion 56, arm support 60 may move with armrest portion 56 when it slides fore and aft, as shown by a dashed outline 64 and corresponding movement arrow 65. Arm support 60 may also be adjusted for height as indicated by dashed outline 66. In addition, the incline of arm support 60 may be adjusted by tilting arm support 60 forward, as indicated by an arrow 68, or rearward, as indicated by an arrow 70.

Figure 4:
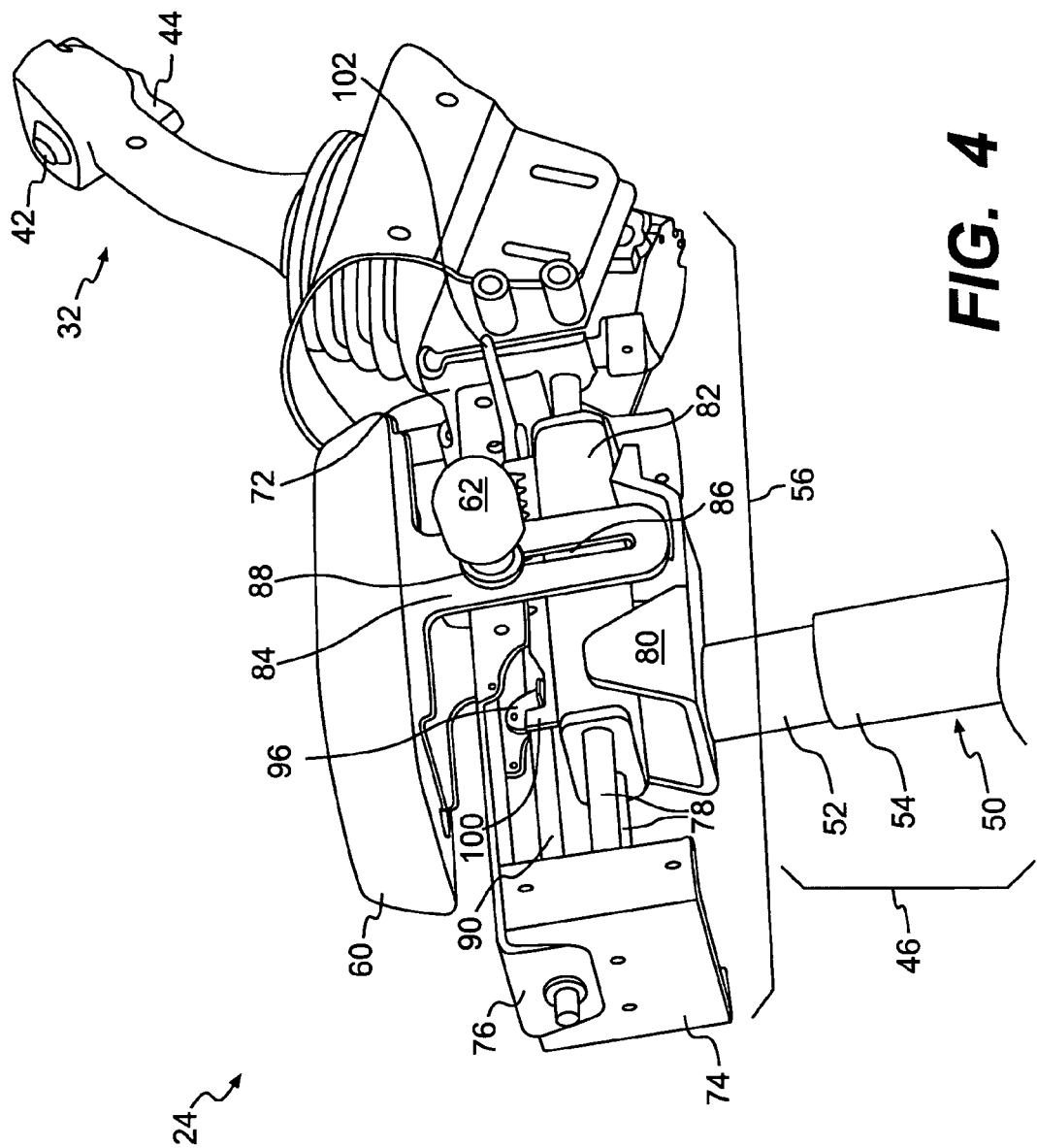
FIG. 4 is another diagrammatic perspective view of the control pedestal of FIG. 2.

FIG. 4 illustrates the inner framework and components of armrest portion 56. The framework of armrest portion 56 may include three brackets to which its outer panels are attached. A front bracket 72 and a rear bracket 74 may be joined by an upper bracket 76 and one or more rods 78. Joystick 32 may be mounted to front bracket 72.

Armrest portion 56 may further include a lower bracket 80, which may be fixedly attached to base 46. A slide housing 82 may be fixedly attached to lower bracket 80. Rods 78 may pass through slide housing 82, which may include low friction components such as bearings or bushings to enable rods 78 to slide back and forth through slide housing 82. Because front bracket 72, rear bracket 74, and upper bracket 76 are fixedly attached to rods 78, these components also slide back and forth relative to slide housing 82, lower bracket 80, and base 46.

In addition, FIG. 4 illustrates the mechanism by which arm support 60 may be adjusted. Arm support 60 may include downwardly extending side plates 84 extending down on both sides of upper bracket 76. Side plates 84 may include slots 86. Slots 86 may receive a threaded bolt (not shown) attached to knob 62. By tightening knob 62 (e.g., by turning), clamping members 88 may be pressed against the outer sides of side plates 84, thereby clamping them against upper bracket 76 and preventing them from moving relative to upper bracket 76.

In use, an operator may loosen knob 62 to allow arm support 60 to move freely with respect to upper bracket 76. The operator may then adjust the height and incline of arm support 60. When the operator achieves the desired position of arm support 60, it may be fixed in that position by tightening knob 62.

Figure 5:
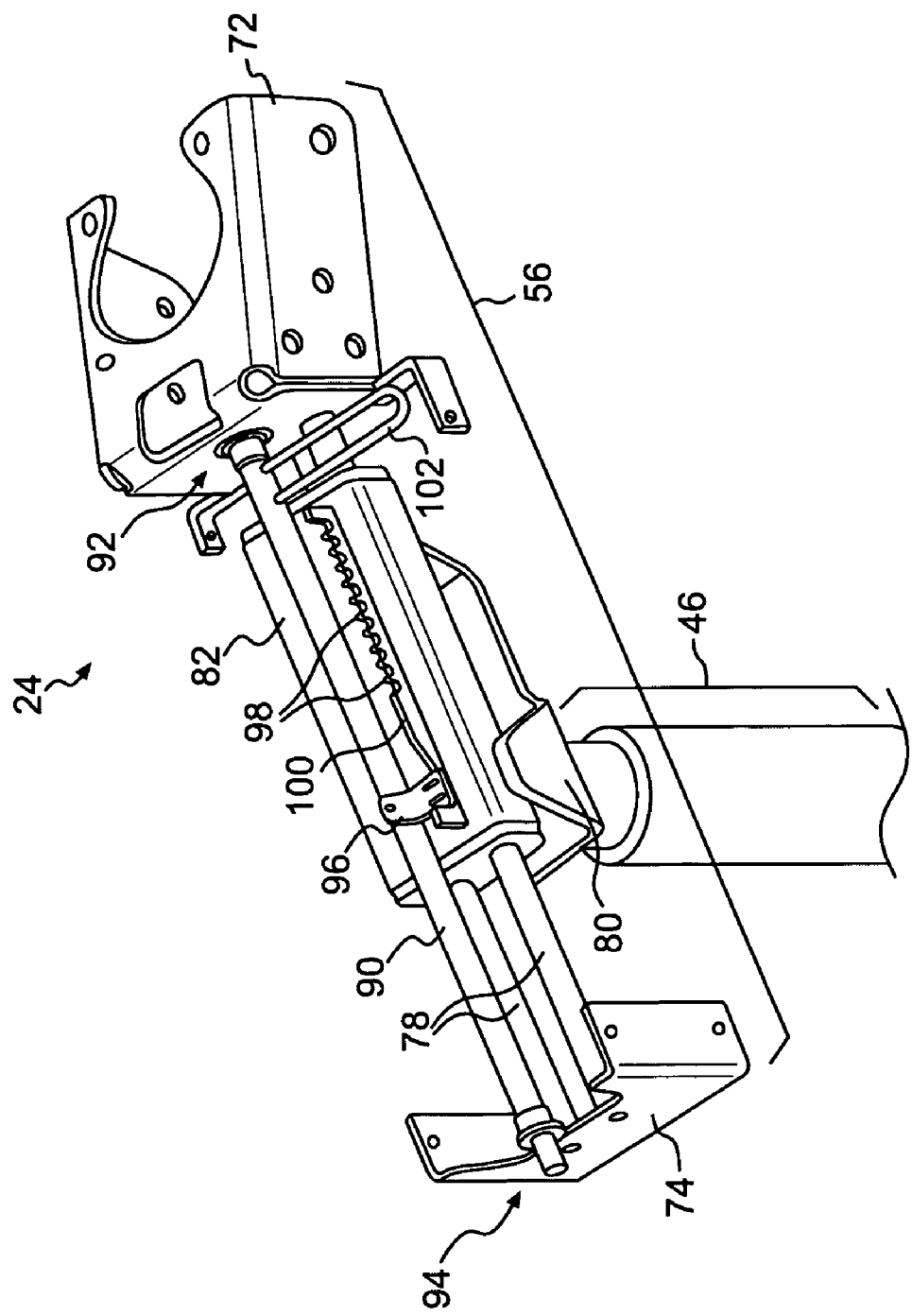
FIG. 5 is a diagrammatic perspective view of a framework of the control pedestal of FIG. 2.

FIG. 5 illustrates the inner framework and components of armrest portion 56 with joystick 32, arm support 60, knob 62, and upper bracket 76 removed, exposing the mechanism by which armrest portion 56 may be slidably adjusted. In order to set armrest portion 56 at different positions along its sliding range of movement, armrest portion 56 may include a latch rod 90 rotatably attached to upper bracket 76 and front bracket 72 at a first end 92 and to upper bracket 76 and rear bracket 74 at a second end 94. First end 92 and second end 94 of latch rod 90 may include bushings, bearings, or any other rotatable coupling to enable rotation of latch rod 90 relative to front bracket 72, rear bracket 74, and upper bracket 76.

Latch rod 90 may further include a latch bracket 96, which may latch onto teeth 98 of a toothed flange 100. Toothed flange 100 may be mounted to the top of slide housing 82. Thus, when latch bracket 96 is latched onto teeth 98, latch rod 90, front bracket 72, rear bracket 74, upper bracket 76, and rods 78 are fixed relative to base 46. Latch rod 90 may also include a handle 102 laterally protruding from latch rod 90 and extending out through the outer side paneling of armrest portion 56. (See FIG. 2.) By lifting handle 102, latch rod 90 may be rotated, thereby unlatching latch bracket 96 from teeth 98, and thus, allowing latch rod 90, front bracket 72, rear bracket 74, upper bracket 76, and rods 78 to slide forward and backward relative to base 46.

Although an exemplary embodiment has been described with regard to the mechanisms that allow adjustability of control pedestal 24, one of ordinary skill in the art may recognize alternative mechanisms to achieve the same or similar adjustability. The components of control pedestal 24 may be made from any materials of suitable strength and properties. Base 46 as well as the framework of armrest portion 56 may be made of materials rigid enough to transmit vibrations from floor 26 to joystick 32 to provide tactile feedback to an operator. Such materials may include metals, plastics, composites, and the like.

INDUSTRIAL APPLICABILITY

The disclosed floor-mounted control pedestal may provide improved tactile feedback to operators of any kind of work machine. The combination of the disclosed floor-mounted control pedestal with a suspended operator seat may provide a comfortable ride for an operator by insulating them from sudden and/or severe movements of the work machine chassis without sacrificing tactile feedback through the control pedestal.

In particular, operators of motor graders may control the blade of the motor grader with a high level of precision. For example, finish grading requires positioning of the blade accurate to within roughly an inch or less. In order to achieve such accuracy, motor grader operators may rely heavily on tactile feedback to monitor the engagement of the blade with the earth. Operators may sense feedback about the load on the blade, which may be an indication of, among other things, how deeply the blade is cutting into the ground. With experience, operators may learn to interpret feedback and to assess whether the blade is positioned properly. Using this feedback, operators may make fine adjustments to the positioning of the blade. When the adjustment is made, a difference in tactile feedback may enable the operators to sense that the adjustment was made and thereby confirm that the ground is being sculpted in a desired manner.

Although motor grader operators may benefit from tactile feedback through the controls, it is not necessarily desirable to transmit such feedback through the operator seat. Because much of the work done by motor graders may involve operation on unpaved surfaces and because the blade may be scraped across gravelly earth, the chassis of a motor grader may be subject to harsh vibrations and an overall rough ride. To provide riding comfort and enable operators to maintain their seating position, motor graders have been provided with suspended seats, which dampen the vibrations. The combination of a suspended seat and the disclosed control pedestal may provide operators of motor graders, as well as other work machines, riding comfort and stability, without sacrificing tactile feedback through the control pedestal. In addition, the adjustability of the disclosed control pedestal may provide versatility to an operator station to enable operators of different stature to comfortably, effectively, and efficiently use the same work machine. Sliding the disclosed armrest portion 56 aft may enable armrest portion 56 to be effectively retracted to facilitate ingress and egress from operator station 14. Further, the sliding fore and aft adjustability of armrest portion 56, as well as the height adjustability of base 46, the height adjustability of arm support 60, and the incline adjustability of arm support 60 may enable differently sized operators to not only adjust control pedestal 24 to comfortably support their arm, but also to position joystick 32 at a comfortable distance within their reach. It will be apparent to those skilled in the art that various modifications and variations can be made to the disclosed work machine control pedestal without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An adjustable control pedestal for a machine comprising:
   a base detached from suspended operator seat of the machine and configured to be rigidly mounted to a chassis of the machine independent from the suspended operator seat;
   an armrest portion having mounted thereto a joystick configured to control movement of a work implement of the machine, the armrest portion being connected to the base and configured to enable an operator to rest an arm on the armrest portion while operating the joystick;
   the armrest portion being linearly movable relative to the base.

2. The control pedestal of claim 1, wherein the base is configured to be mounted to a floor of the machine.

3. The control pedestal of claim 1, further including an arm support mounted to the armrest portion wherein at least one of a height and an incline of the arm support are adjustable relative to the armrest portion.

4. The control pedestal of claim 3, wherein both the height and incline of the arm support are adjustable relative to the armrest portion.

5. The control pedestal of claim 1, wherein a height of the armrest portion relative to the chassis is adjustable.

6. The control pedestal of claim 5, wherein the base telescopically extends and retracts in order to adjust the height of the armrest portion.

7. The control pedestal of claim 1, wherein the armrest portion is rotatable relative to the chassis.

8. A machine comprising:
   an operator station having a floor;
   an operator seat attached to the floor via a suspension system; and a control pedestal detached from the operator seat and including:
   a base fixedly mounted to a chassis of the machine independent from the operator seat; and
   an armrest portion connected to the base and having a joystick mounted thereon configured to control one or more functions of the machine.

9. The machine of claim 8, wherein the base is mounted to the floor.

10. The machine of claim 8, wherein the armrest portion is movable fore and aft relative to the base.

11. The machine of claim 8, further including an arm support mounted to the armrest portion, wherein at least one of a height and an incline of the arm support are adjustable relative to the armrest portion.

12. The machine of claim 11, wherein both the height and incline of the arm support are adjustable relative to the armrest portion.

13. The machine of claim 8, wherein the height of the armrest portion relative to the chassis is adjustable.

14. The machine of claim 13, wherein the base telescopically extends and retracts in order to adjust the height of the armrest portion.

15. The machine of claim 8, wherein the armrest portion is rotatable relative to the chassis.

16. The machine of claim 8, further including:
   a second control pedestal including
     a base mounted to a chassis of the machine; and
     an armrest portion connected to the base and having a joystick mounted thereon configured to control one or more functions of the machine.

17. A motor grader comprising:
a traction system;
a power source;
a work implement;
an operator station having a floor;
an operator seat suspended on the floor; and
a control pedestal detached from the operator seat and including:
   a base fixedly mounted to a chassis of the motor grader independent from the operator seat; and
   an armrest portion connected to the base and having a joystick mounted thereon configured to control movement of a work implement of the motor grader.

18. The motor grader of claim 17, wherein the base is mounted to the floor.

19. The motor grader of claim 17, wherein the armrest portion is movable fore and aft relative to the base.

20. The motor grader of claim 17, further including an arm support mounted to the armrest portion, wherein at least one of a height and an incline of the arm support are adjustable relative to the armrest portion.

21. The motor grader of claim 20, wherein both the height and incline of the arm support are adjustable relative to the armrest portion.

22. The motor grader of claim 16, wherein the height of the armrest portion relative to the chassis is adjustable.

23. The motor grader of claim 22, wherein the base telescopically extends and retracts in order to adjust the height of the armrest portion.

24. The control pedestal of claim 17, wherein the armrest portion is rotatable relative to the chassis.

25. The motor grader of claim 17, further including:
   a second control pedestal detached from the operator seat and including
     a second base rigidly mounted to a chassis of the motor grader independent from the operator seat; and
     a second armrest portion connected to the base and having a joystick mounted thereon configured to control one or more functions of the motor grader.

26. The motor grader of claim 17, further including an arm support mounted to the armrest portion such that a height and an incline of the arm support are adjustable relative to the armrest portion;
the armrest portion being movable fore and aft relative to the base;
the base being configured to telescopically extend and retract in order to adjust the height of the armrest portion relative to the chassis;
the armrest portion being rotatable relative to the chassis;
wherein the base is mounted to the floor.

\* \* \* \* \*

UNITED STATES PATENT AND TRADEMARK OFFICE
CERTIFICATE OF CORRECTION

| | |
|---|---|
| PATENT NO. | : 7,458,439 B2 |
| APPLICATION NO. | : 10/929470 |
| DATED | : December 2, 2008 |
| INVENTOR(S) | : Jonathan Chase Catton |

It is certified that error appears in the above-identified patent and that said Letters Patent is hereby corrected as shown below:

Column 8, line 15, in claim 22, delete "claim 16," and insert -- claim 17, --.

Signed and Sealed this

Fourteenth Day of April, 2009

JOHN DOLL
*Acting Director of the United States Patent and Trademark Office*